United States Patent Office 3,712,910
Patented Jan. 23, 1973

3,712,910
STEREOSPECIFIC METHOD FOR PREPARING ESTRANE COMPOUNDS OF NATURAL CONFIGURATION
Tatyana Andreevna Serebryakova, Ardalion Vladimirovich Zakharychev, Rimma Nuriakhmetovna Chigir, Sofia Nikolaevna Anachenko, Igor Vladimirovich Torgov, and Evgenia Georgievna Krjutchenko, Moscow, U.S.S.R., assignors to Institut Khimii Prirodnykh Soldineny Akademii Nauk SSSR, Moscow, U.S.S.R.
No Drawing. Filed Feb. 24, 1971, Ser. No. 118,550
Int. Cl. C07c 167/12
U.S. Cl. 260—397.5                          6 Claims

ABSTRACT OF THE DISCLOSURE

The present invention relates to a stereospecific method for preparing estrane compounds of natural configuration having the following general formula

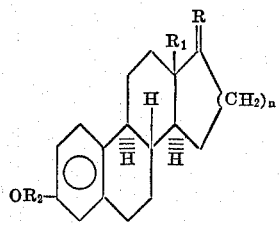

wherein R represents O, OH, OCOCH$_3$; R$_1$ represents H, CH$_3$, C$_2$H$_5$, n-C$_3$H$_7$; R$_2$ represents H, CH$_3$, COCH$_3$; $n$ is an integer between 1, and 2.

The said method comprises subjecting $\Delta^{8(9)}$-dehydroestrone compounds of the general formula:

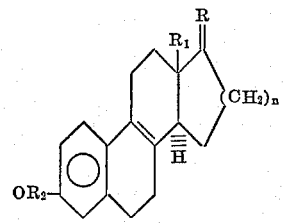

wherein R represents O, OH, OCOCH$_3$; R$_1$ represents CH$_3$, C$_2$H$_5$, n-C$_3$H$_7$; R$_2$ represents H, CH$_3$; COCH$_3$; $n$ is an integer between 1 and 2, to a reduction process with a mixture of trifluoroacetic acid with triethylsilane in an inert organic medium such as benzene or methylene chloride and isolating the desired product.

The indicated method is applied in the synthesis of female sex hormone-d and d,l-estradiol-3,17β and its analogues, in the synthesis of 19-norsteroids, contraceptive and anabolic preparations.

---

The present invention relates to the production of steroid compounds, and more particularly to a stereospecific method for preparing estrane compounds of natural configuration of the general formula:

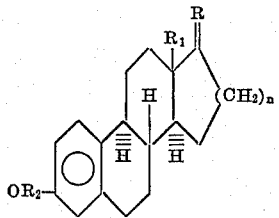

wherein R represents O, OH, OCOCH$_3$; R$_1$ represents CH$_3$, C$_2$H$_5$, n-C$_3$H$_7$; R$_2$ represents H, CH$_3$, COCH$_3$; $n$ is an integer between 1 and 2.

The proposed method is applied in the synthesis of the female sex hormone—d and d,l-estradiol-3,17β and its analogues used in medical practice for treating diseases of the genital region, atherosclerosis and tumors. Besides, the proposed method is used in the synthesis of 19-norsteroids, contraceptive and anabolic preparations employed as growth stimulants for farm animals.

Known at present is a method for stereospecific reduction of styrene $\Delta^{8(9)}$-double bond in estrane compounds of natural configuration. This method may be used for the preparation of estrane compounds of the general formula:

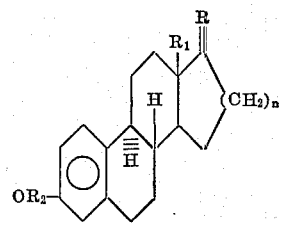

wherein R represents OH; R$_1$ represents CH$_3$, C$_2$H$_5$, n-C$_3$H$_7$; R$_2$ represents CH$_3$; $n$ is an integer between 1 and 2.

The method comprises adding the initial $\Delta^{8(9)}$-dehydroestrane compounds in a mixture of tetrahydrofuran with ether to purified and dried ammonia while stirring at a temperature range of 60 to 70° C., then adding potassium by portions and holding the reaction mixture for 1.5 to 2 hours at a temperature of 60 to 70° C., and adding ammonium chloride by portions. After the ammonia has evaporated the residue is treated with water, extracted with ether and the extract is neutralized with carbon dioxide, washed with water, dried and evaporated. After distilling off the solvent, the obtained product is crystallized or purified by adsorption chromatography (Belgium Pat. No. 632,345; Author's Certificate of the U.S.S.R. No. 130,368, No. 157,056).

The known method has several disadvantages. It cannot be applied to compounds that have a hydroxyl group at C$_3$ (R$_2$ represents H), nor for compounds that have a keto- or ester group at C$_{17}$ or C$_{17a}$ (R represents O, OCOCH$_3$). The method requires large quantities of ammonia of high purity and readily inflammable solvents (ether, tetrahydrofuran). The method requires high purity of all reactants, underestimation of this fact leads to non-repeatable results or to a decrease in the yield of the desired product. A disadvantage of the method is the complexity of the equipment required to hold the temperature at 60 to 70° C. and the complexity of the technology that in some cases included chromatographic purification over aluminium oxide with the use of large quantities of readily inflammable solvents.

The object of the present invention is to eliminate the above-said disadvantages.

In accordance with the said general object of the invention the specific object was to simplify the operating process and the equipment by changing the technological operations.

The solution of the problem was such that in the stereospecific method of preparing estrane compounds of natural configuration of the general formula:

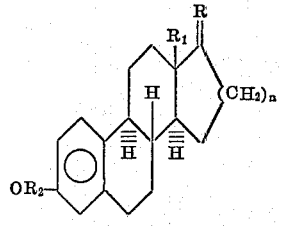

wherein R represents O, OH, OCOCH₃; R₁ represents CH₃, C₂H₅, n-C₃H₇; R₂ represents H, CH₃, COCH₃; $n$ is an integer between 1 and 2, according to the invention $\Delta^{8(9)}$ dehydroestrone compounds of the general formula:

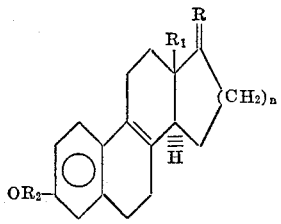

wherein R represents O, OH, OCOCH₃; R₁ represents CH₃, C₂H₅, n-C₃H₇; H₂ represents H· CH₃, COCH₃; $n$ is an integer between 1 and 2, are reduced with a mixture of trifluoroacetic acid and triethylsilane in an inert organic solvent medium with subsequent isolation of the desired product.

As an inert organic solvent it is expedient to use benzene or methylene chloride. It is preferable to run the process at a molar ratio of $\Delta^{8(9)}$-dehydroestrone compounds, trifluoroacetic acid and triethylsilane of 1:20 to 50:20.

For the preparation of estrane compounds of the general formula:

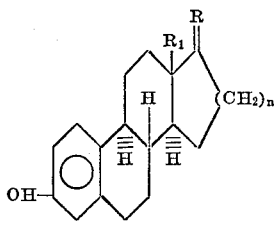

wherein R represents O, OCOCH₃; R₁ represents C₂H₅, n-C₃H₇; $n$ is an integer between 1 and 2, isolation of the desired product is carried out by treating the reaction mixture with ice water, extracting the product successively with benzene and chloroform, washing the extract with 5 to 10 percent aqueous solution of sodium bicarbonate and evaporating the solvent. For the preparation of estrane compounds of the general formula:

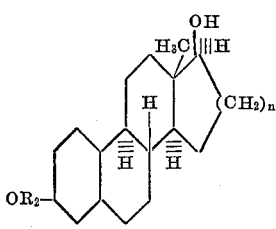

wherein R₂ represents H, CH₃; $n$ is an integer between 1 and 2, isolation of the desired product is carried out by treating the reaction mixture with ice water, extracting 17- or 17a-trifluoroacetate of the desired product successively with benzene and chloroform, washing the obtained extract with 5 to 10 percent aqueous solution of sodium bicarbonate, evaporating the solution and saponifying with sodium borohydride in methanol or 5 percent methanol solution of alkali at a temperature of 40° C., treating the reaction mixture with 2 percent acetic acid and subsequent isolation of the crystallized product. For preparing the 3-methyl ether of estradiol-17β, the 3-methyl ether of $\Delta^{8(9)}$-dehydroestrone is reduced with a mixture of trifluoroacetic acid with triethylsilane at a molar ratio of 1:50:20 while boiling.

The proposed method is accomplished in the following manner.

To a solution of the initial $\Delta^{8(9)}$-dehydroestrone compounds in methylene chloride or benzene, triethylsilane and trifluoroacetic acid are added, preferably at a molar ratio of 1:20 to 50:20. The reaction mixture is held without stirring at a temperature of 20° C. for from 3 to 48 hours depending on the structure of the initial $\Delta^{8(9)}$-dehydroestrone compound. The isolation of the target product varies depending on the structure of the initial $\Delta^{8(9)}$-dehydroestrone compound. If 17-keto or 17-a-o-acyl $\Delta^{8(9)}$-dehydroestrone compounds are reduced, then the reaction mixture is poured into ice water, extracted successively with benzene and chloroform, the extract is washed with an aqueous sodium bicarbonate solution and after evaporating the solvent the desired product is obtained. If 17- or 17-a-hydroxy estrone compounds are reduced, then the reaction mixture is treated with ice water, 17- or 17-a-trifluoroacetate of the desired product are extracted successively with benzene and chloroform, the extract is washed with a 5 to 10 percent aqueous sodium bicarbonate solution, the solvent is evaporated, the residue is saponified with sodium borohydride in methanol or a 5 percent methanol solution of alkali at a temperature of 40° C., the reaction mixture is treated with a 2 percent acetic acid and the crystallized product is isolated.

The proposed method permits simultaneous and stereospecific reduction of $\Delta^{8(9)}$-styrene double bond and 17-keto-group in the initial $\Delta^{8(9)}$-dehydrostrane compound. For example, for the 3-methyl ether of $\Delta^{8(9)}$-dehydroestrane the 3-methyl ether of estradiol can be produced by reduction with a mixture of triethylsilane with trifluoroacetic acid in an inert solvent (benzene, methylene chloride) while boiling, with subsequent treatment of the reaction mixture with ice water and extraction of the obtained product.

The proposed method allows a simplification of the operating process, for the process may be carried out at a temperature of 20° C. and the necessity of chromatography over adsorbents is eliminated.

The proposed method features simple equipment as compared to the known method, for it does not require cooling equipment, easily inflammable alkali metals and solvents. The method is applicable to $\Delta^{8(9)}$-dehydroestrane compounds containing a keto or ester group (R represents O, OCOCH₃) at $C_{17}$ or $C_{17a}$ and for compounds containing the hydroxyl group (R₂ represents H) at $C_3$. The proposed method is highly stereospecific.

Several examples of the stereospecific method for preparing estrane compounds of natural configuration are presented hereinbelow for a better understanding of the present invention.

EXAMPLE 1

1.2 g. of 18-nor-13-ethyl-$\Delta^{1,3,5(10),8(9)}$-estratetraenol 3-one-17, with a melting point of 252–254° C. is dissolved in 120 ml. of absolute benzene containing 12 ml. of triethylsilane. 5.8 ml. of trifluoroacetic acid is added to the mixture and is held at a temperature of 20° C. for 48 hours. The mixture is poured into ice water and is extracted successively with benzene and chloroform. The extract is washed with a 5 to 10 percent aqueous solution of sodium bicarbonate and is evaporated. The residue is washed with ether and 900 mg. (75 weight percent of the theoretical yield) of 18-nor-12-ethyl-estrone are obtained, with a melting point of 228–231° C. that does not show a depression of the melting point as compared with a sample prepared by the known method. From the mother liquor 150 g. of less pure product is isolated in addition, with a melting point of 215–225° C. and 70 mg. with a melting point of 195–220° C.

EXAMPLE 2

1.7 g. of 18-nor-13-propyl-$\Delta^{1,3,5(10),8(9)}$-estratetraenol-3-one-17 with a melting point of 231–237° C. is dissolved in 85 ml. of absolute benzene containing 15 ml. of triethylsilane. 6 ml. of trifluoroacetic acid is added to the mixture and held for 45 hours at a temperature of 20° C. Subsequently the procedure of Example 1 is followed. 1.2 g. (75 weight percent of the theoretical yield) of 18-nor-13-n-propyl-estrone is obtained with a melting point of 220–226° C. From the mother liquor 50 mg. of the desired product is additionally obtained with a melting point of 195–210° C.

EXAMPLE 3

200 mg. of $\Delta^{8(9)}$-dehydro-d-homoestradiol diacetate is dissolved in 10 ml. of absolute benzene containing 2 ml. of triethylsilane. 2.5 ml. of trifluoroacetic acid is poured into the solution and held for 48 hours at a temperature of 20° C. The mixture is poured into ice water, extracted with benzene and chloroform. The extract is washed with a 5 to 10 percent aqueous solution of sodium bicarbonate and is evaporated, the residue is dissolved in 16 ml. of methanol and 1 g. of sodium borohydride in 24 ml. of methanol is added and stirred at a temperature of 40° C. for 4 hours. The mixture is poured into 2 percent acetic acid, the precipitated crystals are filtered and 120 mg. (60 percent of the theoretical yield) of d-homoestradiol is obtained with a melting point of 203–207° C. that does not show depression of the melting point as compared with a sample prepared by the known method.

EXAMPLE 4

500 mg. of $\Delta^{8(9)}$-dehydro-d-homoestradiol is dissolved in 70 ml. of absolute benzene containing 0.95 ml. of triethylsilane. 1 ml. of trifluoroacetic acid is added to the solution and held for 24 hours at a temperature of 20° C. Subsequently the procedure of Example 3 is followed. 260 mg. of crystalline product are obtained with a melting point of 199–204° C., from which after crystallization from methanol 170 mg. of d-homoestradiol is isolated with a melting point of 207–212° C. that does not show depression of the melting point as compared with a sample prepared by the known method, but contains, judging by the UV spectrum ($\lambda_{max}$ 278, 355 m$\mu$ $\epsilon$ 2550; 64), 2 weight percent of d-homoequilenol that is not separated by crystallization.

EXAMPLE 5

500 mg. of the 3-methyl ether of $\Delta^{8(9)}$-dehydroestradiol-17 is dissolved in 25 ml. of benzene containing 5 ml. of 3-ethylsilane. 2.4 ml. of trifluoroacetic acid is added to the solution and held at a temperature of 20° C. for 3 hours. Subsequently the procedure of Example 3 is followed. 300 mg. (60 weight percent of the theoretical yield) of the 3-methyl ether of estradiol-17 is obtained with a melting point of 129–131° C. that does not show depression of the melting point as compared with sample prepared by the known method.

EXAMPLE 6

1 g. of 3-methyl ether of $\Delta^{8(9)}$-dehydroestrone is dissolved in a mixture of 10 ml. of dry benzene with 10.7 ml. of triethylsilane. 13.1 ml. of trifluoroacetic acid is added to the solution and boiled for 0.5 hour. The reaction mixture is poured into an aqueous solution of sodium bicarbonate with ice, the obtained product was extracted with benzene and then with chloroform. The extract is washed with water and evaporated. The residue is dissolved in 20 ml. of a 5 percent potassium hydrate in methanol and boiled for 2.5 hours. The mixture is poured into cold water and extracted with benzene. The extract is washed with diluted muriatic acid, then with water and evaporated. The crystalline residue is washed with methanol and 610 mg. (60 weight percent of the theoretical yield) of 3-methyl ether of the estradiol-17 is obtained with a melting point of 123–127° C. that does not show a depression of the meltiing point as compared with a sample prepared by the known method.

What we claim is:

1. A stereospecific method for preparing estrane compounds of natural configuration of the general formula:

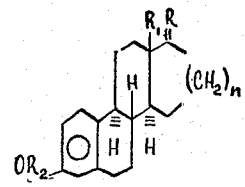

wherein
R is selected from the group consisting of O, OH, OCOCH$_3$;
R$_1$ is selected from the group consisting of CH$_3$, C$_2$H$_5$, n-C$_3$H$_7$;
R$_2$ is selected from the group consisting of H, CH$_3$, COCH$_3$;
n is selected from the group consisting of 1,2;
comprising reducing $\Delta^{8(9)}$-dehydroestrane compounds of the general formula:

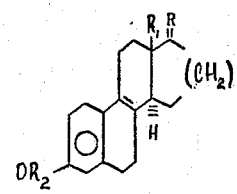

wherein
R is selected from the group consisting of O, OH, OCOCH$_3$;
R$_1$ is selected from the group consisting of CH$_3$, C$_2$H$_5$, n-C$_3$H$_7$;
R$_2$ is selected from the group consisting of H, CH$_3$, COCH$_3$;
n is selected from the group consisting of 1,2,
with a mixture of trifluoroacetic acid with triethylsilane in an inert organic solvent medium and isolating the product.

2. A method as claimed in claim 1, in which benzene or methylene chloride are used as an inert organic solvent.

3. A method as claimed in claim 1 in which $\Delta^{8(9)}$-dehydroestrane compounds, trifluoroacetic acid and triethylsilane are taken at a molar ratio of 1:20—50:20.

4. A method as claimed in claim 1 in which for preparing estrane compounds of the general formula:

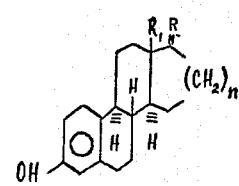

wherein
R is selected from the group consisting of O, OCOCH$_3$;
R$_1$ is selected from the group consisting of C$_2$H$_5$, n-C$_3$H$_7$;
n is selected from the group consisting of 1,2,
the isolation of the product is carried out by treating the obtained reaction mixture with ice water, extracting the product successively with benzene and chloroform, washing the extract with an aqueous solution of sodium bicarbonate and evaporating the solvent.

5. A method as claimed in claim 1, in which for preparing estrane compounds of the general formula:

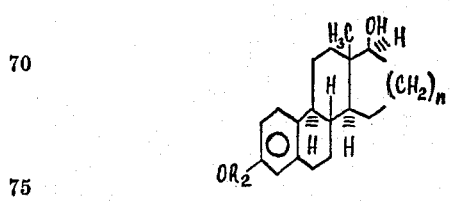

wherein $R_2$ is selected from the group consisting of H, $CH_3$;

$n$ is selected from the group 1,2 the isolation of product is carried out by treating the reaction mixture with ice water, extracting the 17- and 17a-trifluoroacetate of the desired product successively with benzene and chloroform, washing with an aqueous solution of sodium bicarbonate, evaporating the solvent, saponifying the residue with sodium borohydride in methanol or a 5 percent methanol solution of alkali at a temperature of 40° C., treating the reaction mixture with 2 percent acetic acid and isolating the crystallized product.

6. A method as claimed in claim 5 in which for preparing the 3-methyl ether of estradiol-17β, the 3-methyl ether of $\Delta^{8(9)}$-dehydroestrone is reduced with a mixture of trifluoroacetic acid with triethylsilane taken at a molar ratio of 1:50:20 while boiling.

No references cited.

HENRY A. FRENCH, Primary Examiner

U.S. Cl. X.R.

260—397.4